United States Patent
Son

(10) Patent No.: US 8,997,459 B2
(45) Date of Patent: Apr. 7, 2015

(54) $NO_x$ EMISSION REDUCTION SYSTEM AND METHOD

(75) Inventor: In-Hyuk Son, Yongin-Si (KR)

(73) Assignee: Samsung SDI Co., Ltd. (KR)

( * ) Notice: Subject to any disclaimer, the term of this patent is extended or adjusted under 35 U.S.C. 154(b) by 1122 days.

(21) Appl. No.: 12/880,900

(22) Filed: Sep. 13, 2010

(65) Prior Publication Data
US 2011/0167799 A1    Jul. 14, 2011

(30) Foreign Application Priority Data
Jan. 12, 2010    (KR) ........................ 10-2010-0002695

(51) Int. Cl.
*F01N 3/20*    (2006.01)
*H01M 8/06*    (2006.01)
(Continued)

(52) U.S. Cl.
CPC .......... *F01N 3/2066* (2013.01); *B01D 53/9418* (2013.01); *Y02T 90/32* (2013.01); *B01D 2258/012* (2013.01); *B01D 53/9431* (2013.01); *Y02T 10/24* (2013.01); *B01D 2251/202* (2013.01); *F01N 2610/04* (2013.01); *Y02C 20/10* (2013.01); *H01M 8/0612* (2013.01); *H01M 2250/20* (2013.01); *H01M 2250/407* (2013.01); *B01D 53/90* (2013.01); *H01M 8/0662* (2013.01);
(Continued)

(58) Field of Classification Search
USPC ..................................... 60/286, 295, 301, 303
See application file for complete search history.

(56) References Cited

U.S. PATENT DOCUMENTS

| 7,163,668 B2 | 1/2007 | Bartley et al. |
| 2002/0031453 A1 | 3/2002 | Ogino |
| 2004/0247960 A1* | 12/2004 | Sato et al. ........................ 429/20 |

(Continued)

FOREIGN PATENT DOCUMENTS

| JP | 63-298973 A | 12/1988 |
| JP | 2002-079058 A | 3/2002 |
| KR | 1020070047231 | 4/2007 |

OTHER PUBLICATIONS

KIPO Notice of Allowance (Korean only) issued Mar. 20, 2012 for the corresponding Korean priority application No. 10-2010-0002695.

V. Houel, et al. "Promoting functions of $H_2$ diesel-SCR over silver catalysts" Applied Catalysis B: Environmental vol. 77, Issues 1-2, Nov. 30, 2007, pp. 29-34.

*Primary Examiner* — Kenneth Bomberg
*Assistant Examiner* — Jonathan Matthias
(74) *Attorney, Agent, or Firm* — Knobbe, Martens, Olson & Bear LLP

(57) ABSTRACT

A method and system to reduce $NO_x$ emissions from an engine connected to a fuel tank and an exhaust line, the apparatus including, a reformer to reform the fuel into hydrogen ($H_2$); a fuel cell stack to convert the hydrogen into electricity; a reduction unit disposed on the exhaust line to convert the $NO_x$ into $N_2$; a first bypass line to provide a fluid communication between the first fuel tank and the fuel reformer; a second bypass line to provide a fluid communication between the fuel reformer and the fuel cell stack; a first reformate line to provide a fluid communication between the second bypass line and the exhaust line. The hydrogen is mixed with the $NO_x$ in the exhaust line, and then the reduction unit uses the hydrogen to convert the $NO_x$ into nitrogen ($N_2$).

17 Claims, 2 Drawing Sheets

(51) Int. Cl.
*B01D 53/90* (2006.01)
*B01D 53/94* (2006.01)

(52) U.S. Cl.
CPC ............ *Y02E 60/50* (2013.01); *F01N 2240/30* (2013.01); *B01D 2255/104* (2013.01); *Y02E 60/563* (2013.01)

(56) References Cited

U.S. PATENT DOCUMENTS

2005/0022450 A1* 2/2005 Tan et al. .................... 48/198.3
2006/0130462 A1* 6/2006 Wancura ........................ 60/286
2006/0248876 A1 11/2006 Taxon

* cited by examiner

$NO_x$ EMISSION REDUCTION SYSTEM AND METHOD

CROSS-REFERENCE TO RELATED APPLICATIONS

This application claims the benefit of Korean Patent Application No. 10-2010-0002695, filed in the Korean Intellectual Property Office on Jan. 12, 2010, the disclosure of which is incorporated herein by reference in its entirety.

BACKGROUND

1. Field

An exemplary embodiment of the present disclosure relates to a vehicular NOx emission reduction system and method, which operate using hydrogen from a fuel cell.

2. Description of the Related Art $NO_x$, which refers to $NO_2$ and NO, is a common atmospheric pollutant. NOx is generated naturally by microorganism, but is also generated during the combustion of fossil fuels. NOx combines with water vapor to form nitrous acid or nitric acid, which are precipitated as acid rain. Also, nitrous acid and nitric acid photochemically react with hydrocarbons in the air, to form aldehydes, acrolein, and Peroxy Acetyl Nitrate (PAN), which are secondary pollutants. In addition, $NO_x$ forms nitrous oxide ($N_2O$), which is a green house gas that also reacts with other pollutants, to form photochemical smog, thereby causing much damage to urban environments.

When the fuel is combusted at high temperature, such as during heavy acceleration in a vehicle, atmospheric nitrogen is subject to an oxidation reaction. This generates a large amount of $NO_x$, especially in diesel engines. $NO_2$ is a red-brown poisonous gas having a pungent odor, and is considered a main cause of several respiratory diseases.

In addition to $NO_x$, diesel engines also produce particulate matter (PM). Specifically, there is an inverse proportion relation between the relative amounts of $NO_x$ and PM produced by diesel engines (when the $NO_x$ is reduced, the PM amount is increased, and vice versa). In other words, when a diesel engine operates at a high temperature and a high ignition point, such that a high rate of combustion is achieved, the amount of PM is reduced, but the amount of $NO_x$ is increased. For this reason, it is difficult to simultaneously reduce the PM and the $NO_x$, in an internal combustion engine. Further, exhaust treatment devices are needed, in order to satisfy proposed Euro-V or Euro-VI regulations.

Recently, $NO_x$ emission standards have been tightened, resulting in research into methods of catalytically treating $NO_x$ with $N_2$. For example, currently proposed NOx reduction methods include $NO_x$ Storage and Reduction (NSR), HC-SCR, Urea-SCR, etc. The NSR method associates a diesel fuel cracking catalyst (DFC) with a lean $NO_x$ trap (LNT). The DFC method converts the diesel fuel into $H_2$, CO, etc., to reduce the formation of $NO_x$ during combustion, and the remaining $NO_x$ is discharged through a peroxygen atmosphere, to further reduce $NO_x$ emissions. As a result, $NO_x$ emissions can be reduced by up to 90%, under the condition of a 7% $O_2$ atmosphere. As compared to the Urea-SCR method, the NSR method can be more readily applied to smaller diesel engines and is less complex. However, the NSR method is more costly, in that the LNT includes a large amount of precious metal catalysts.

The Urea-SCR method uses urea as a reduction agent and has a higher NOx removal rate than other systems. However, when the injection control and the system design are not optimized, $NH_3$ slip and salts are generated, which may generate white PM in the discharge gas. In addition, in order to prevent the lifespan of the catalyst from being rapidly shortened, due to reaction with sulfur oxides, and to prevent the corrosion of the apparatus due to ammonium, the Urea-SCR method uses an expensive corrosion resistant materials, which reduces price competitiveness. Further, since the Urea-SCR catalyst (a V-based catalyst) is classified as a hazardous material, the movement thereof between nations is restricted. Therefore, there is a demand for the development of an alternate technology.

U.S. Pat. No. 7,163,668 B2, teaches a method of reducing $NO_x$ emissions, using a hydrogen selective catalytic reduction (H-SCR) unit. In particular, an Ag/Alumina catalyst with low De-$NO_x$ activity is used in conjunction with a reducing agent composed of a mixture of hydrogen and diesel fuel, it has been reported that the activity of the catalyst is rapidly increased, even at low temperatures, such that the activate temperature zone is expanded. Therefore, a new possibility of the diesel De-NOx technology has been emerging.

In the above-mentioned Patent FIG. 1 shows a process that reforms (POX+WGS) diesel fuel in a partial oxidation unit $10a$, and a WGS catalyst $10c$ mixes $H_2$ and CO generated thereby with an exhaust stream 14 containing $NO_N$. The resultant passes through an H-SCR catalyst layer to perform a De-$NO_x$ reaction. In particular, in order to increase the yield of $H_2$, $H_2O$ is supplied from the outside, before the WGS reaction is performed, using air for the reforming.

In addition, FIG. 2 shows a method that reforms hydrogen using oxygen in an exhaust stream for the reforming reaction, without supplying air from the outside, as in FIG. 1. However, despite the possibility, more studies are still demanded to practically use the NO reduction apparatus.

SUMMARY

The present disclosure provides a method and an apparatus using by-products of a fuel cell, in order to reduce $NO_x$ emissions from a vehicle having a diesel engine.

In addition, the present disclosure provides a method and an apparatus using an anode off gas (AOG) of a fuel cell, in order to reduce $NO_x$ emissions.

Further, the present disclosure provides a control unit that controls the use of by-products of a fuel cell, according to whether a vehicle is operated.

Moreover, the present disclosure provides a control unit that controls the ratio of a reformate gas and an AOG that is distributed to an $NO_x$ reduction apparatus.

An exemplary embodiment of the present disclosure provides a method for reducing $NO_x$ emissions from an engine that includes a main fuel line, through which fuel is delivered from a fuel tank, and an exhaust line that discharges the exhaust, the method including: reforming fuel supplied from the fuel tank in a fuel reformer, to generate a reformate gas; delivering the generated reformate gas to the exhaust line and a fuel cell stack; and transferring the exhaust and the reformate gas to a reduction unit, to reduce $NO_x$ to $N_2$.

An exemplary embodiment of the present disclosure provides a method for reducing $NO_x$ from exhaust discharged from an engine that includes a main fuel line through which fuel is delivered from a fuel tank, and an exhaust line that discharges the exhaust, the method including: reforming a fuel supplied from a separate fuel tank in a fuel reformer, to generate reformate gas; delivering the generated reformate gas to the exhaust line and a fuel cell stack; and transferring the exhaust and the reformate gas to a reduction unit to reduce $NO_x$ using hydrogen of the reformate gas.

The method for reducing NOx may further include oxidizing and developing the reformate gas in the stack and delivering anode off gas (AOG) from the stack to the exhaust line. The reducing the $NO_x$ uses hydrogen included in the AOG the hydrogen of the reformate gas for reducing the $NO_x$.

An exemplary embodiment of the present disclosure provides an $NO_x$ emission reduction system to reduce emissions from exhaust discharged from an engine that includes a main fuel line through which fuel is delivered from a fuel tank, and an exhaust line that discharges the exhaust, the apparatus including: a fuel reformer, a stack, a reduction unit, and a reformate gas control value.

According to various embodiments, the fuel reformer reforms the fuel supplied from the fuel tank, to generate a reformate gas. The fuel cell stack oxidizes the reformate gas to produce electricity, and discharges an anode off gas (AOG). The reduction unit reduces $NO_x$ discharged through the exhaust line, using hydrogen as a reducing agent. The reformate gas control valve is connected to the stack to control the distribution of the reformate gas to the exhaust line and the fuel cell stack.

According to various embodiments of the present disclosure, provided is an $NO_x$ emission reduction system to reduce $NO_x$ emission from exhaust discharged from an engine that includes a main fuel line through which fuel is delivered from a fuel tank, and an exhaust line that discharges the exhaust, the apparatus including: another fuel tank, a fuel reformer, a fuel cell stack, a reduction unit, and a reformate gas control value.

According to various embodiments, the other fuel tank supplies another fuel to the fuel reformer, which reforms the fuel into a reformate gas. The reformate gas is supplied to the fuel cell stack, to generate electricity. The stack discharges an anode off gas (AOG). The reduction unit reduces $NO_x$ discharged through the exhaust line, using hydrogen as a reducing agent. The reformate gas control valve is connected to the stack to selectively distribute the reformate gas to the exhaust line and the fuel cell stack.

According to various embodiments, the fuel reformer may include a water/gas shift reactor.

An exemplary embodiment of the present disclosure includes a heat source and an anode off gas control valve. The heat source heats the fuel reformer, using the AOG. The anode off gas control value controls the supply the AOG to the heat source.

According to various embodiments, the anode off gas control valve may be further connected to the exhaust line and may control the distribution of the AOG to the heat source unit and the exhaust line.

According to various embodiments, the fuel tank may supply diesel fuel.

According to various embodiments, the reduction unit may reduce $NO_x$ through a preferential selective catalytic reduction reaction using hydrogen. In addition, the reduction unit may use an Ag/Alumina catalyst.

According to various embodiments, the system may include a controller that controls the reformate gas control valve, such that the reformate gas is not delivered to the exhaust line when the engine is off and the fuel reformer and the stack are operated.

An exemplary embodiment of the present disclosure may include a controller that controls the anode off gas control valve and the reformate gas control valve, respectively, so that the AOG and the reformate gas are not delivered to the exhaust line, when the engine is off and the fuel reformer and the stack are operated.

According to various embodiments, the controller controls the anode off gas control valve and the reformate gas control value, respectively, so that the anode off gas and the reformate gas are delivered by an amount in inverse proportion to used power when the engine, the fuel reformer, and the stack are in an operation state and power generated from the stack is used through an external circuit.

Further, an exemplary embodiment of the present disclosure can control the amount of hydrogen supplied to the reduction unit, according to the driving state of the vehicle and the power demands applied to the fuel cell stack.

An exemplary embodiment of the present disclosure blocks the hydrogen introduction from the fuel cell stack, when the vehicle is not driven, thereby making it possible to reduce the waste of fuel introduced into the fuel cell.

Additional aspects and/or advantages of the disclosure will be set forth in part in the description which follows and, in part, will be obvious from the description, or may be learned by practice of the disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
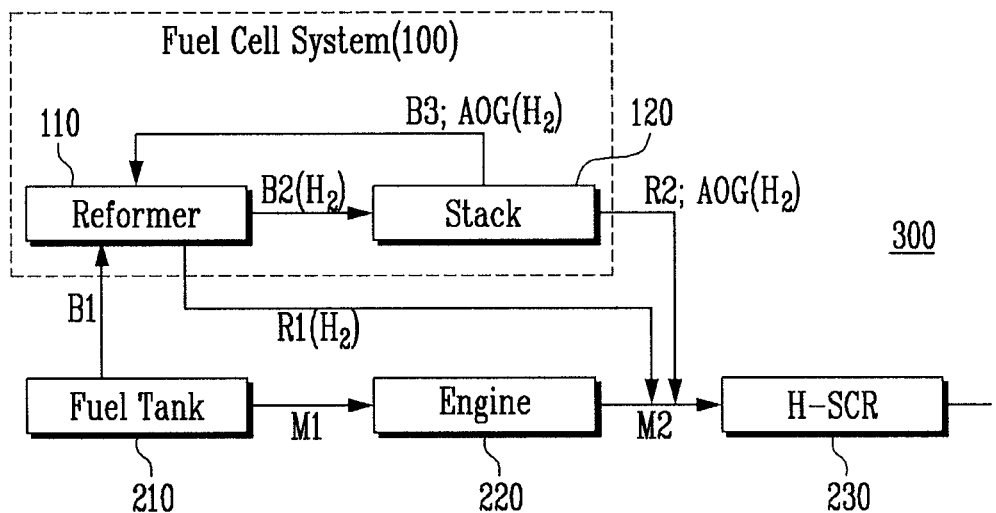
FIG. 1 is a block diagram showing an $NO_x$ emission reduction system to reduce $NO_x$ exhaust emissions from a diesel engine, using a fuel cell stack, according to an exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

As those skilled in the art would realize, the described exemplary embodiments may be modified in various ways, without departing from the spirit or scope of the present disclosure. Accordingly, the drawings and description are to be regarded as illustrative in nature and not restrictive. In addition, when an element is referred to as being "on" another element, it can be directly on the other element or may be indirectly on the other element, with one or more intervening elements interposed therebetween. Also, when an element is referred to as being "connected to" another element; it can be directly connected to the other element, or may be indirectly connected to the other element, with one or more intervening elements interposed therebetween.

FIG. 1 illustrates an $NO_x$ emission reduction system 300, according to an exemplary embodiment of the present disclosure. Referring to FIG. 1, the system 300 includes a driving unit, a fuel cell system 100, and a reduction unit 130. The reduction unit 130 may be a hydrogen selective catalytic reduction (H-SCR) unit. The driving unit 102 includes a fuel tank 210, a fuel line M1, an engine 220, and an exhaust line M2. The driving unit may be incorporated into a vehicle. The fuel cell system 100 includes a fuel reformer 110 and a fuel cell stack 120. The system 300 further includes: reformate lines R1 and R2 that respectively connect the reformer and the stack 120 to the exhaust line M1; a bypass line B1 that connects the fuel tank 210 to the reformer 110; and bypass lines B2 and B3 that independently connect the reformer 110 and the stack 120. Herein, such connections may be referred to as fluid communications.

The fuel tank 210 stores a fuel to operate the engine 220. The fuel is supplied to the engine 220 through the fuel line M1. The fuel is also supplied to the fuel reformer 110, through the bypass line B1. The fuel is generally diesel fuel, and the engine 220 is generally a diesel engine, but the present disclosure is not limited thereto, as other fuels and engine types may also be used. The engine 220 combusts the fuel, and exhaust from the engine 220 is discharged through the exhaust line M2.

The fuel reformer 110 reforms the fuel supplied from the fuel tank 210, to generate a reformate gas. Generally, in the fuel reformer 110 the fuel undergoes a water gas shift (WGS) reaction and/or a preferential carbon monoxide oxidation (PROX) reaction, or the like. The fuel reformer 110 may also include a desulfurizer to remove a sulfur component from the fuel. The WGS reaction produces hydrogen and a carbon monoxide byproduct. The PROX reaction reduces the concentration of the carbon monoxide, such that the reformate gas is composed of primarily hydrogen gas ($H_2$). Herein, the reformate gas may be referred to simply as hydrogen ($H_2$).

The reformate gas is supplied to anodes of the stack 120, via the bypass line B2, where it is oxidized to generate electricity. The electricity can be supplied to various devices, such as components of a vehicle including the engine 220. In particular, the reformate gas supplied to the stack 120 is oxidized into water, while electrons are collected by the anodes of the stack 120.

The stack 120 may produce an anode off gas (AOG) which may include water vapor and $H_2$ that was not oxidized in the stack 120. Herein the AOG may be referred to as hydrogen ($H_2$). The AOG may be supplied to the exhaust line M2, via the reformate line R2, where it is mixed with the exhaust. The resultant mixture (mixed exhaust stream) is then delivered to the reduction unit 230, via the exhaust line M2. The AOG may also be returned to the reformer 110, via the bypass line B3, where it is used to operate a heat source (not shown), such as a burner, included in the reformer 110. The heat source may be used to heat the reformer 110 to a preset operating temperature. The AOG may also be mixed with natural gas, propane, etc, prior to being supplied to the heat source.

The reduction unit 230 removes $NO_x$ from the mixed exhaust stream. In particular, the reduction unit 230 includes a catalyst that facilitates a reduction reaction between the $NO_x$ and the hydrogen of the mixed exhaust stream. In other words, the hydrogen from the reformate gas and/or the AOG is used as a reducing agent, to reduce the $NO_x$ through a preferential catalytic reduction reaction. The catalyst may be an Ag/alumina catalyst, to expand an active temperature zone of the preferential catalytic reduction reaction.

Figure 2:
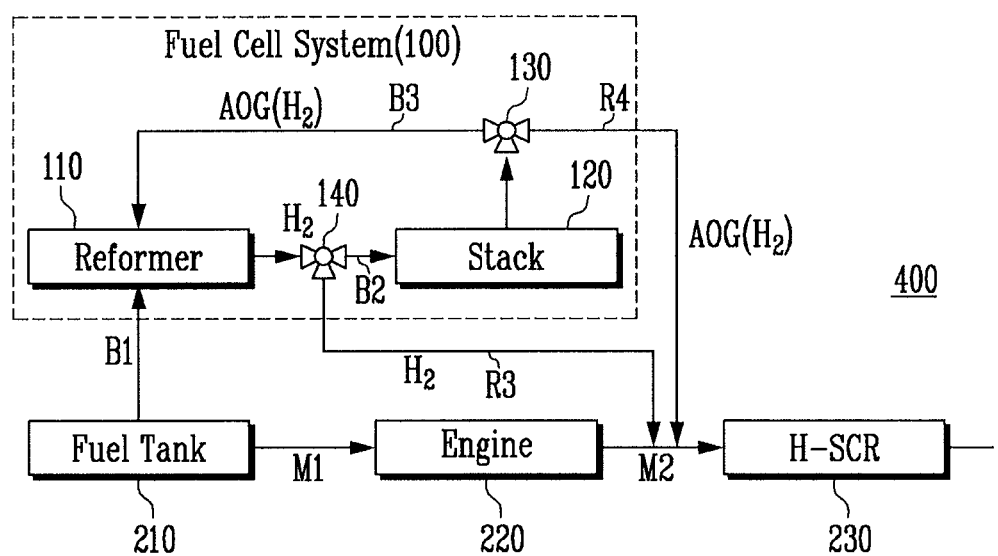
FIG. 2 is a block diagram showing an exemplary embodiment of an $NO_x$ emission reduction system to reducing $NO_x$ emissions from a diesel engine using a fuel cell stack, according to an exemplary embodiment of the present disclosure.

FIG. 2 illustrates a $NO_x$ emission reduction system 400, according to another exemplary embodiment of the present disclosure. As shown in FIG. 2, the system 400 is similar to the system 300, so only the differences will be described in detail. In particular, the system includes reformate lines R3 and R4, in place of the reformate lines R1 and R2. In addition, the system includes an anode off gas control valve 130 disposed on the bypass line B3, and a reformate gas control valve 140 disposed on the bypass line B2. The reformate line R2 extends between the valve 140 and the exhaust line M2. The reformate line R4 extends between the valve 130 and the exhaust line M2.

The fuel is transferred from the fuel tank 210 to the reformer 110 and the engine 220, via lines B1 and M1, respectively. The fuel reformer 110 reforms the fuel into a reformate gas, as described above.

The reformate gas control valve 140 is disposed on the bypass line B2, between the fuel reformer 110 and the stack 120, and is also connected to the reformate line R3. The reformate gas control valve 140 selectively controls the amount of the reformate gas that is delivered from the fuel reformer 110, to the stack 120 and to the exhaust line M2. The reformate gas control valve 140 may be a proportionate valve, so as to adjust the relative amounts of the reformate gas that is delivered to the stack 120 and the exhaust line M2. The reformate gas control valve 140 may include a pump (not shown) or a blower (not shown), etc., in order to reinforce the delivering force. The reformate gas control valve 140 may include a check valve, etc., in order to prevent backflow.

The anode off gas control valve 130 is disposed on the bypass line B3, and receives the AOG discharged from the stack 120. The reformate line R4 provides a fluid communication between the anode off gas control valve 130 and the exhaust line M2. The anode off gas control valve 130 controls the distribution amount, ratio, and period of the AOG gas to the reformer 110 and the exhaust line M2, and may be similar to the reformate gas control valve 140.

The heat source (not shown) of the fuel reformer 110 is used to control the temperature thereof. In order to prevent improper ignition (backfire) of the AOG, due to the temperature of the heat source, the AOG may be supplied in pulses. The anode off gas control valve 130 may be used to create such pulses.

As described above, the reduction unit 230 receives the reformate gas/AOG and the exhaust, via the exhaust line M2. The reduction unit chemically reduces the $NO_x$ included in the exhaust into $N_2$, using hydrogen as a reducing agent.

Figure 3:
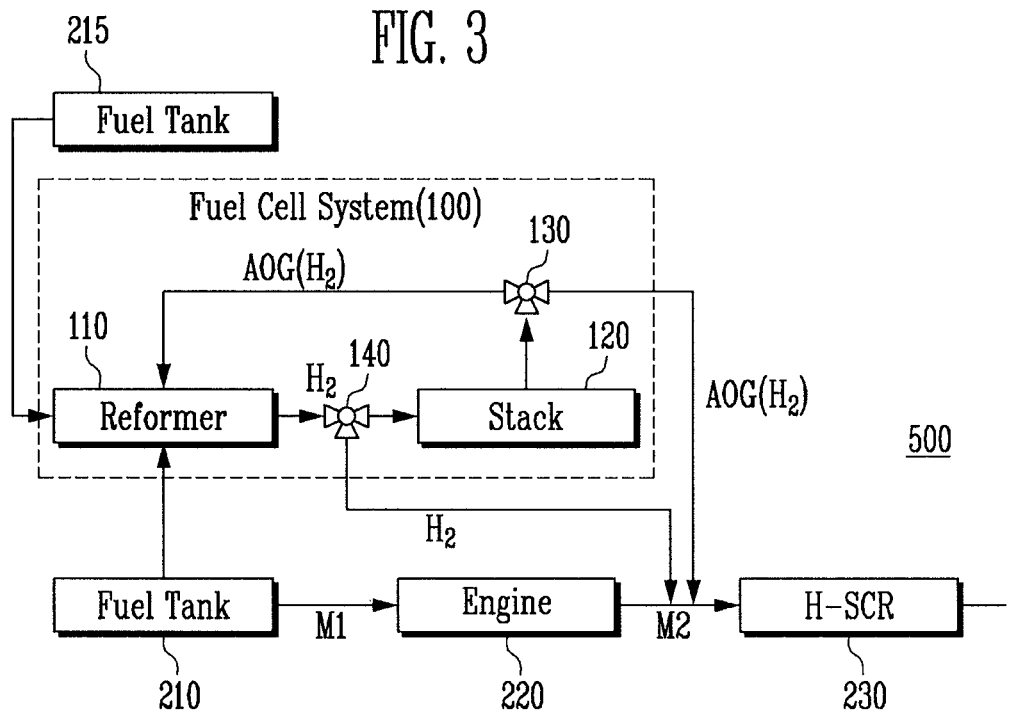
FIG. 3 is a block diagram of an $NO_x$ emission reduction system that includes separate fuel tank, according to an exemplary embodiment of the present disclosure.

FIG. 3 illustrates an $NO_x$ emission reduction system 500, according to an aspect of the present disclosure. As shown in FIG. 3, the reduction system 500 is similar to the reduction system 400, so only differences therebetween will be described in detail. Unlike the reduction system 400, the reduction system 500 further includes another fuel tank 215 to supply fuel to the reformer 110.

As a result, the fuel reformer 110 may receive fuel from either of the fuel tanks 210, 215. The fuel included in the fuel tank 215 may be a fuel such as natural gas, propane, city gas, or the like, which may be more readily processed by the reformer 110 into a reformate gas, as compared to diesel fuel or gasoline. Thus, quality and/or production efficiency of the reformer 110 may be increased.

Figure 4:
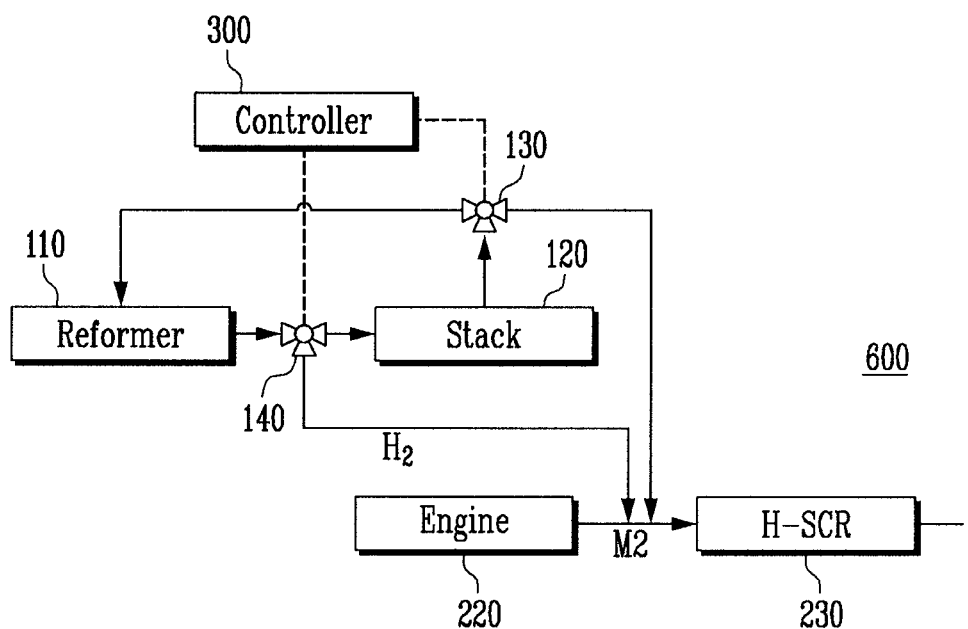
FIG. 4 is a block diagram schematically showing a connection state of a controller, according to an exemplary embodiment of the present disclosure.

FIG. 4 illustrates an $NO_x$ emission reduction system 600, according to an aspect of the present disclosure. The reduction system 600 is similar to the reduction system 400, so only differences therebetween will be described in detail. As shown in FIG. 3, the reduction system includes a controller 300 that controls the operation of the valves 130 and 140. In particular, the controller may vary the amount of hydrogen that is applied to the exhaust line, in accordance with the amount of $NO_x$ produced by the engine 220.

When the reduction system 600 is employed in a vehicle, such as in a recreational vehicle, tractor trailer, or the like, the fuel cell stack 120 may be used to provide electrical power to the vehicle, when the engine 220 is not operated. In such a case, the controller 300 controls the reformate gas control valve 140 and the anode off gas control valve 130, such that hydrogen is not supplied to the exhaust line M2.

In addition, when the engine 220 and the fuel cell stack 120 are simultaneously operated, the controller may vary the amount of hydrogen that is applied to the exhaust line M2, in accordance with the amount of $NO_x$ produced by the engine 220 and/or the amount of load applied to the fuel cell stack 120. In other words, when there is a high demand for electricity, and a low load on the engine 220, the amount of the reformate gas and/or AOG that is supplied to the exhaust line M2 may be reduced. In addition, when there is a low load applied to the fuel cell stack 120 and a high load applied to the engine 120, the amount of the reformate gas and/or the AOG supplied to the exhaust line M2 may be increased.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents.

What is claimed is:

1. A $NO_x$ emission reduction system to reduce $NO_x$ emissions from an internal combustion engine, the system comprising:
   an internal combustion engine fluidly connected to a fuel tank;
   an exhaust line fluidly connected to the internal combustion engine;
   a fuel reformer to reform a first fuel into hydrogen ($H_2$);
   a fuel cell stack to convert the hydrogen into electricity, the fuel cell stack fluidly connected to the fuel reformer via a first pipe;
   a hydrogen selective catalytic reduction (H-SCR) unit disposed on the exhaust line to convert the $NO_x$ into $N_2$ using the hydrogen;
   a second pipe fluidly connecting the fuel cell stack to the fuel reformer, the second pipe not in fluid communication with the first pipe;
   a reformate line to provide a fluid communication between the first pipe and the exhaust line; and
   a valve disposed on the first pipe, to independently control flow rates of the hydrogen through the reformate line and the first pipe.

2. The system of claim 1, further comprising another fuel tank to supply a second fuel to the reformer, wherein the second fuel is more efficiently converted into hydrogen by the reformer than the first fuel.

3. A $NO_x$ emission reduction system to reduce $NO_x$ emissions from an internal combustion engine, the system comprising:
   a fuel reformer to reform the fuel into hydrogen ($H_2$);
   a fuel cell stack to convert the hydrogen into electricity;
   an internal combustion engine fluidly connected to a fuel tank by a fuel line;
   an exhaust line fluidly connecting the engine to a reduction unit, the reduction unit capable of converting $NO_x$ to $N_2$ and $O_2$;
   a first bypass line fluidly connecting the fuel tank to a fuel reformer, the reformer configured to reform the fuel into hydrogen ($H_2$);
   a second bypass line to provide a fluid communication between the fuel reformer and a fuel cell stack fluidly connecting the fuel reformer to a fuel cell stack;
   the reduction unit disposed on the exhaust line, to convert the $NO_x$ into $N_2$;
   the first bypass line providing a fluid communication between the fuel tank and the fuel reformer;
   the second bypass line providing a fluid communication between the fuel reformer and the fuel cell stack;
   a third bypass line fluidly connecting the fuel cell stack to a burner of the fuel reformer, the third bypass line not fluidly connected to either the first bypass line or the second bypass line;
   a first reformate line to provide a fluid communication between the second bypass line and the exhaust line; and
   a first valve disposed on the second bypass line, to independently control flow rates of the hydrogen through the first reformate line and the second bypass line.

4. The system of claim 3, further comprising another fuel tank to supply another fuel to the reformer.

5. The system of claim 3, further comprising a second reformate line fluidly connecting the fuel cell stack and the exhaust line.

6. The system of claim 3 further comprising:
   a second reformate line to provide a fluid communication between the third bypass line and the exhaust line; and
   a second valve disposed on the third bypass line, to independently control flow rates of the hydrogen through the second reformate line and the third bypass line.

7. The system of claim 6, wherein the hydrogen flowing through the second reformate line and the third bypass line is in the form of an anode off gas emitted from the fuel cell stack.

8. The system of claim 6, further comprising a controller to control the first and second valves, such that the hydrogen is not delivered to the exhaust line, when the engine is off and the fuel reformer and the fuel cell stack are on.

9. The system of claim 6, further comprising a controller to control the first and second valves, such that the hydrogen is delivered to the burner, when the temperature of the reformer is below a preset temperature, and the hydrogen is not delivered to the exhaust line, when the engine is off.

10. The system of claim 6, further comprising a controller to control the first and the second valves, such that an amount of the hydrogen that is delivered to the exhaust line is increased in correspondence with an increase in the amount of the $NO_x$ produced by the engine.

11. The system of claim 3, wherein the fuel is diesel fuel.

12. The system of claim 3, wherein unit is a hydrogen selective catalytic reduction (H-SCR) unit.

13. The system of claim 12, wherein the reduction unit comprises an Ag/Alumina catalyst.

14. The system of claim 3, wherein the first reformate line is directly connected to the first valve.

15. A method of reducing $NO_x$ emissions from an internal combustion engine, the method comprising:
   supplying fuel from a fuel tank to an internal combustion engine;
   conducting exhaust from the internal combustion engine through an exhaust line;
   supplying the fuel to a fuel reformer;
   generating hydrogen ($H_2$) in the fuel reformer;
   supplying the hydrogen to a fuel cell stack and simultaneously supplying the hydrogen to the exhaust line by use of a single valve to produce a mixture of the hydrogen and the exhaust;
   supplying the mixture to a reduction unit to convert $NO_x$, into nitrogen ($N_2$) and oxygen ($O_2$); and
   supplying anode off gas from the fuel cell stack to the fuel reformer, wherein the anode off gas does not mix with either the fuel from the fuel tank or the hydrogen ($H_2$,) supplied to the fuel cell stack.

16. The method according to claim 15 further comprising using the fuel cell stack to produce electricity; and supplying the anode off gas from the fuel cell stack to the exhaust line.

17. A method of reducing $NO_x$ emissions from an internal combustion engine, the method comprising:
- supplying a first fuel from a first fuel tank to an internal combustion engine;
- conducting exhaust from the internal combustion engine though an exhaust line;
- supplying a second fuel from a second fuel tank to a fuel reformer;
- generating hydrogen ($H_2$) in the fuel reformer;
- supplying the hydrogen to a fuel cell stack and simultaneously supplying the hydrogen to the exhaust line by use of a single valve to produce a mixture of the hydrogen and the exhaust;
- supplying the mixture to a reduction unit to convert $NO_x$ into nitrogen ($N_2$) and oxygen ($O_2$); and
- supplying anode off gas from the fuel cell stack to the fuel reformer, wherein the anode off gas does not mix with either the fuel from the fuel tank or the hydrogen ($H_2$) supplied to the fuel cell stack.

* * * * *